United States Patent [19]
Lee

[11] Patent Number: 5,133,030
[45] Date of Patent: Jul. 21, 1992

[54] FIBER OPTIC SWITCH HAVING A CURVED REFLECTOR

[76] Inventor: Jerald D. Lee, Box 4 Burrows Run Rd., Mendenhall, Pa. 19357

[21] Appl. No.: 735,661

[22] Filed: Jul. 26, 1991

Related U.S. Application Data

[63] Continuation of Ser. No. 452,147, Dec. 18, 1989, abandoned.

[51] Int. Cl.$^5$ .................................................. G02B 6/26
[52] U.S. Cl. ...................................... 385/19; 385/15; 385/16; 385/23
[58] Field of Search ............... 350/96.15, 96.18, 96.20; 385/15, 16, 19, 23

[56] References Cited

U.S. PATENT DOCUMENTS

| Re. 31,579 | 5/1984 | Jaeschke | 335/151 |
|---|---|---|---|
| 3,883,223 | 5/1975 | Hudson | 350/96.16 |
| 3,886,544 | 5/1975 | Narodney | 350/96.15 X |
| 4,223,978 | 9/1980 | Kummer et al. | 358/96.20 |
| 4,303,302 | 12/1981 | Ramsey et al. | 350/96.20 |
| 4,416,856 | 3/1979 | Jaeschke | 335/151 |
| 4,422,714 | 12/1983 | Benoit et al. | 350/96.15 |
| 4,452,507 | 6/1984 | Winzer | 350/96.20 |
| 4,607,160 | 8/1986 | Sakakino | 250/227 |
| 4,735,477 | 4/1988 | Bowen | 350/96.15 |
| 4,763,978 | 8/1988 | Courtney-Pratt et al. | 350/96.18 |
| 4,814,600 | 3/1989 | Bergström | 350/96.15 X |

FOREIGN PATENT DOCUMENTS

| 0012274 | 6/1980 | European Pat. Off. |
| 0299604 | 1/1989 | European Pat. Off. |
| 2014751 | 2/1978 | United Kingdom |

*Primary Examiner*—Akm E. Ullah
*Assistant Examiner*—Stephen W. Barns

[57] ABSTRACT

A switch for controlling the transmission of light from a first optical fiber to at least a second optical fiber or from a single bidirectional optical fiber back to itself includes a housing having a spherical concave reflector mounted therewithin. Fiber mounting means is provided for mounting optical fiber(s) at a predetermined location within the housing such that at least a portion of a beam of light emanating from the end face of one fiber propagates along an incidence path toward the reflector from which it is reflected by the curved concave reflector along a predetermined reflectance path. A light interrupter is mounted within the housing for switchable movement between a light transmissive state and a light interruptive state. A light absorbing member is positioned such that residual light reflected from the light interrupter is directed toward and absorbed by the light absorbing member. A switch presence indicator for providing an indication that the light interrupter is disposed in the interdiction position may also be included.

51 Claims, 9 Drawing Sheets

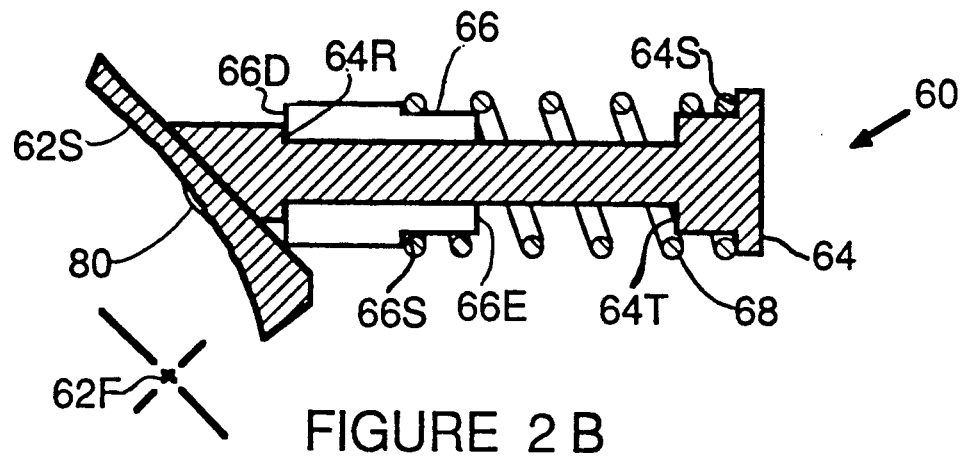
FIGURE 2B
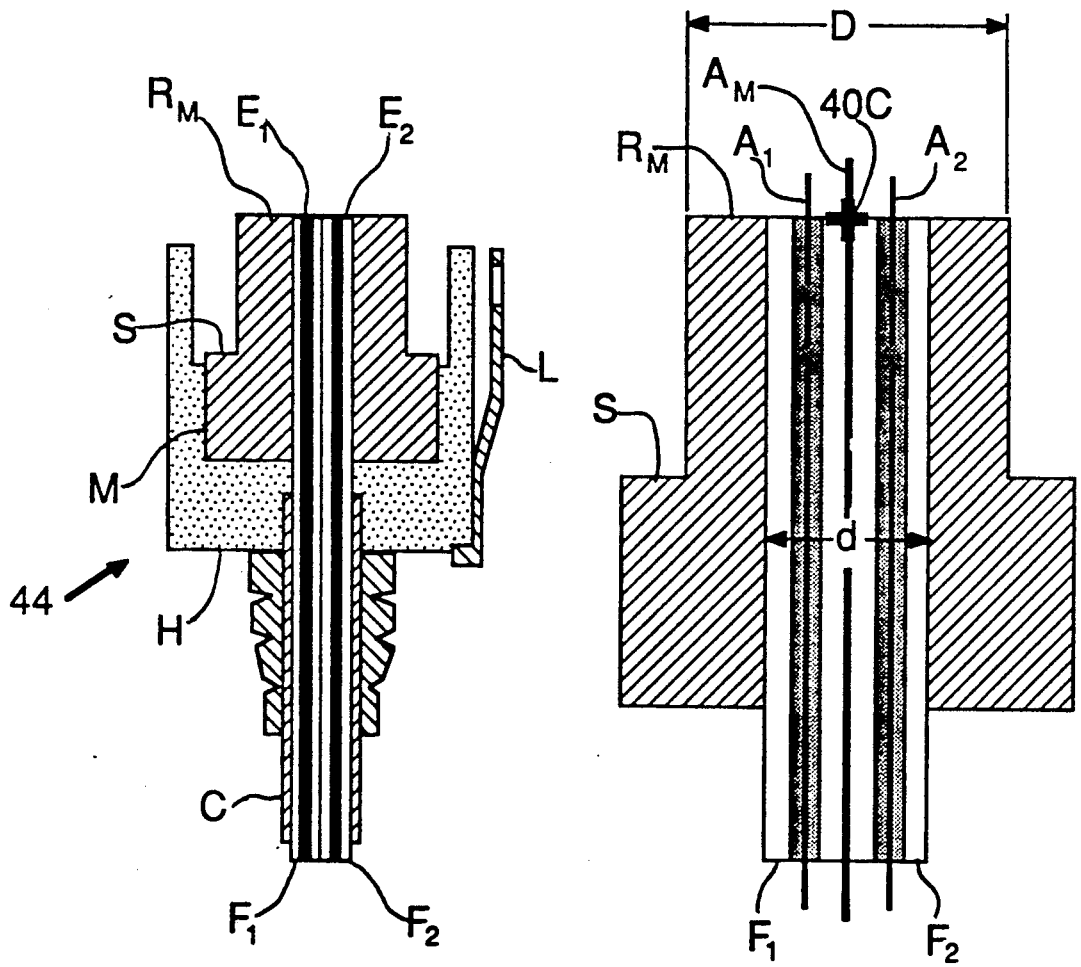
FIGURE 2C
FIGURE 2D

FIBER OPTIC SWITCH HAVING A CURVED REFLECTOR

This application is a continuation of application Ser. No. 07/452,147, filed Dec. 18, 1989, now abandoned.

BACKGROUND OF THE INVENTION

1. Field of the Invention

This invention relates to a switch for controlling the transmission of light from a first optical fiber to at least a second optical fiber or for controlling the bidirectional flow of light in a single fiber.

2. Description of the Prior Art

Local area networks and industrial control systems using fiber optic cable as the medium for transmission of information and control signals are displacing systems that use metallic wires as the transmission medium. In fabricating such systems the ability to switch light from one fiber optic cable to another is important for system operation.

One class of switches for optical fibers disposes at least a first and a second optical fiber in generally confronting end-to-end, axially alignable relationship. In this class of switch one of the optical fibers is mounted on a fixed member while the other optical fiber is mounted on a movable member. An actuator is used to displace the movable member to bring the fibers into or out of the aligned relationship. Exemplary of such a switch is that disclosed and claimed in copending application Ser. No. 07/262,935. Other examples of this class of switches are those described in U.S. Pat. Nos. 4,416,856 and Re. 31,579 (both to Jaeschke) and U.S. Pat. No. 4,452,057 (Winzer). Each of the switches disclosed in these patents includes magnetically actuated switching elements. U.S. Pat. No. 4,303,302 (Ramsey et al.) discloses a piezoelectric actuated switching element. U.S. Pat. No. 4,223,978 (Klummer et al.) shows a motor-actuated, rotatably driven switching element.

There is also know in the art another class of switches in which the end faces of the optical fibers are nonconfrontationally disposed. In such an arrangement light emanating from one of the optical fibers is directed toward a reflector. The reflector acts to re-direct the light toward the end face of the other of the optical fibers. The reflector may take various forms, such as a corner reflector or a spherical reflector. The switch, in either form, may include one or more lenses of various types.

Exemplary of a switch employing corner reflectors is European Patent Application 12,274 (Aoyama). This application discloses, in one embodiment thereof, the use of a single corner reflector to direct the light from a first optical fiber to a second optical fiber. In a second embodiment a laterally displaceable prism is used to couple light from a first corner reflector to a second corner reflection and then to a third fiber. Another example of a switch employing a corner reflector is U.S. Pat. No. 4,607,160 (Sakakino), in which a corner reflector directs light from a first optical fiber to a second optical fiber. A moving vane is disposed in a slot between the two reflecting surfaces of the corner reflector to interrupt the light beam. None of the aforementioned patents is believed readily able to be used with a single bidirectional optical fiber and are believed disadvantageous in this regard.

Exemplary of a switch employing a spherical reflector is European Patent Application 299,604 (Kokoshvili), in which the spherical reflector is displaced laterally to effect the switching action. Another example of a switch using a spherical reflector is U.K. Application 2,014,751 (Merz and Hodge), in which a spherical reflector directs light from a first to a second optical fiber or from a first to a third fiber. In the device show in this application the spherical reflector is displaced rotationally to effect the switching action. The description of switches in these patents relates only to the use of physically separated optical fibers.

In industrial control applications it is especially important to verify system integrity. This may be accomplished in the case of an electrical industrial control system by connecting a high value resistor in parallel to a switch to provide a small loop current when the switch is open. In such a system the receiving circuit associated with the switch senses this current to verify loop integrity. If the loop current drops below a threshold level, a fault indication is produced which may be used to activate safety devices. None of the above mentioned patent references disclosing fiber optic systems provides an arrangement for detecting that the optical circuit is intact. For this reason the switches shown in the above mentioned patents are believed disadvantageous for industrial control applications.

In view of the foregoing it is believed advantageous to provide a switch that is usable with one bidirectional optical fiber or with one or more pairs of either single mode or multimode optical fibers. It is also believed advantageous to provide a switch that may be used in conjunction with appropriate functional elements to provide the capability to verify system integrity when using a fiber optic transmission medium. In particular, it is believed advantageous to detect that the optical circuit is intact when the switch is "off".

SUMMARY OF THE INVENTION

The present invention relates to a switch for controlling the transmission of light from a first optical fiber to at least a second optical fiber or from a single bidirectional optical fiber back to itself. The switch includes a housing having a curved, preferably spherical, concave reflector mounted therewithin. Means is provided for mounting the first and the second (and others, if provided) optical fibers or for mounting the single optical fiber at a predetermined location within the housing such that at least a portion of a beam of light emanating from the end face of one optical fiber propagates along an incidence path toward the reflector from which it is reflected by the curved concave reflector along a predetermined reflectance path. A light interrupter is mounted within the housing for switchable movement between a light transmissive state and a light interruptive state.

If multiple optical fibers are used, they are mounted (typically in pairs) such that the intersection of the axis and end face of each optical fiber is in close proximity to and symmetrically disposed about the center of the spherical concave reflector. With the optical fibers so disposed, the rotational position of the fibers has no effect on coupling of light from one fiber to the other. In the case of a single fiber, it is mounted such that the intersection of its axis and its end face is substantially on the center of the spherical concave reflector.

The light interrupter is defined by a member the surface of which in one case takes the form of a segment of a paraboloid, although other forms, such as a piecewise approximation of a paraboloid or a planar surface, may be used. The surface of the light interrupter is formed of an optically opaque material having a surface that is substantially specularly reflective. The light interrupter is displaceable from a retracted position to an interdiction position, and when in the interdiction position the surface of the light interrupter is disposed in at least one of either the incidence path or the reflectance path. The disposition of the light interrupter in the retracted position defines the light transmissive state of the light interrupter while the disposition of the light interrupter in the interdiction position defines the light interruptive state of the light interrupter.

The switch of the present invention further includes a light absorbing member disposed in the housing and positioned with respect to the optically opaque surface of the light interrupter such that light reflected from the light interrupter is directed toward and absorbed by the light absorbing member. The light absorbing member may mounted to or formed integrally with the housing. Alternately the light absorbing member may also be mounted to or or formed integrally with the light interrupter itself. The light absorbing member may take the form of a planar or a grooved surface.

A switch presence indicator for providing an indication that the light interrupter is disposed in the interdiction position may also be included. The switch presence indicator preferably comprises a dot of light scattering material that scatters a predetermined small amount of light emanating from the single fiber or from the first fiber back toward the single fiber or toward the second fiber, respectively, as the case may be.

BRIEF DESCRIPTION OF THE DRAWINGS

The invention will be more fully understood from the following detailed description thereof, taken in connection with the accompanying drawings, which form a part of this application, and in which:

FIGS. 2A, 2B and 2C are views of portions of the structure shown in FIG. 2 isolated for clarity of illustration, while FIG. 2D is an enlarged view of a portion of FIG. 2C;

FIG. 5 is an alternate embodiment of the fiber optic switch in accordance with the present invention wherein a single bidirectional fiber is mounted to the switch via an alternate form of fiber mounting means, and wherein the switch presence indicator is mounted in an alternate location, while FIG. 5A is an enlarged view of a portion of FIG. 5.

DETAILED DESCRIPTION OF THE PRESENT INVENTION

Figure 1:
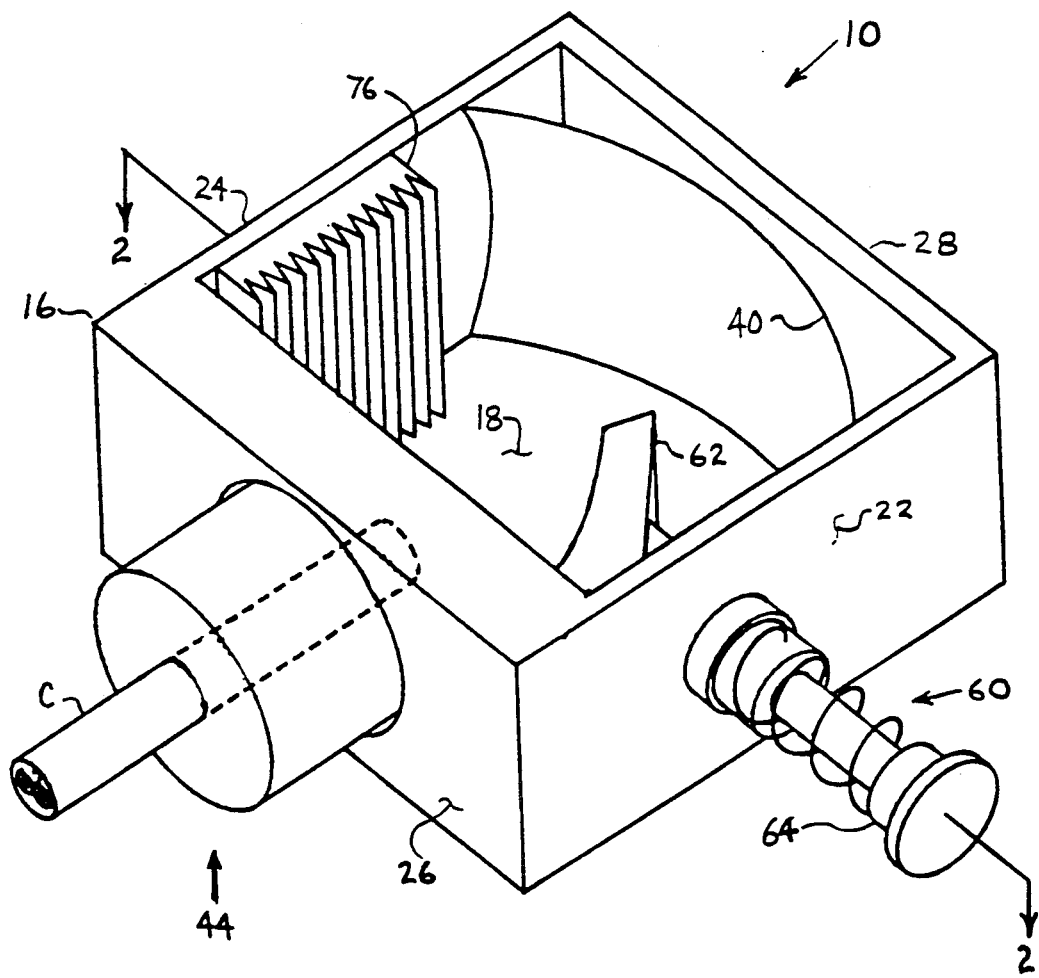
FIG. 1 is a perspective view, shown with the top removed for clarity, of a fiber optic switch in accordance with the present invention.

Throughout the following detailed description similar reference numerals refer to similar elements in all figures of the drawings.

Shown in Figures is a fiber optic switch generally indicated by reference character 10 in accordance with the present invention. It should be understood that the switch 10 as shown in any of the figures in this application may, in use, be modularized for use in a larger assembly or may be used as an independent component. The present invention is contemplated as encompassing all such uses of the switch 10.

Figure 2:
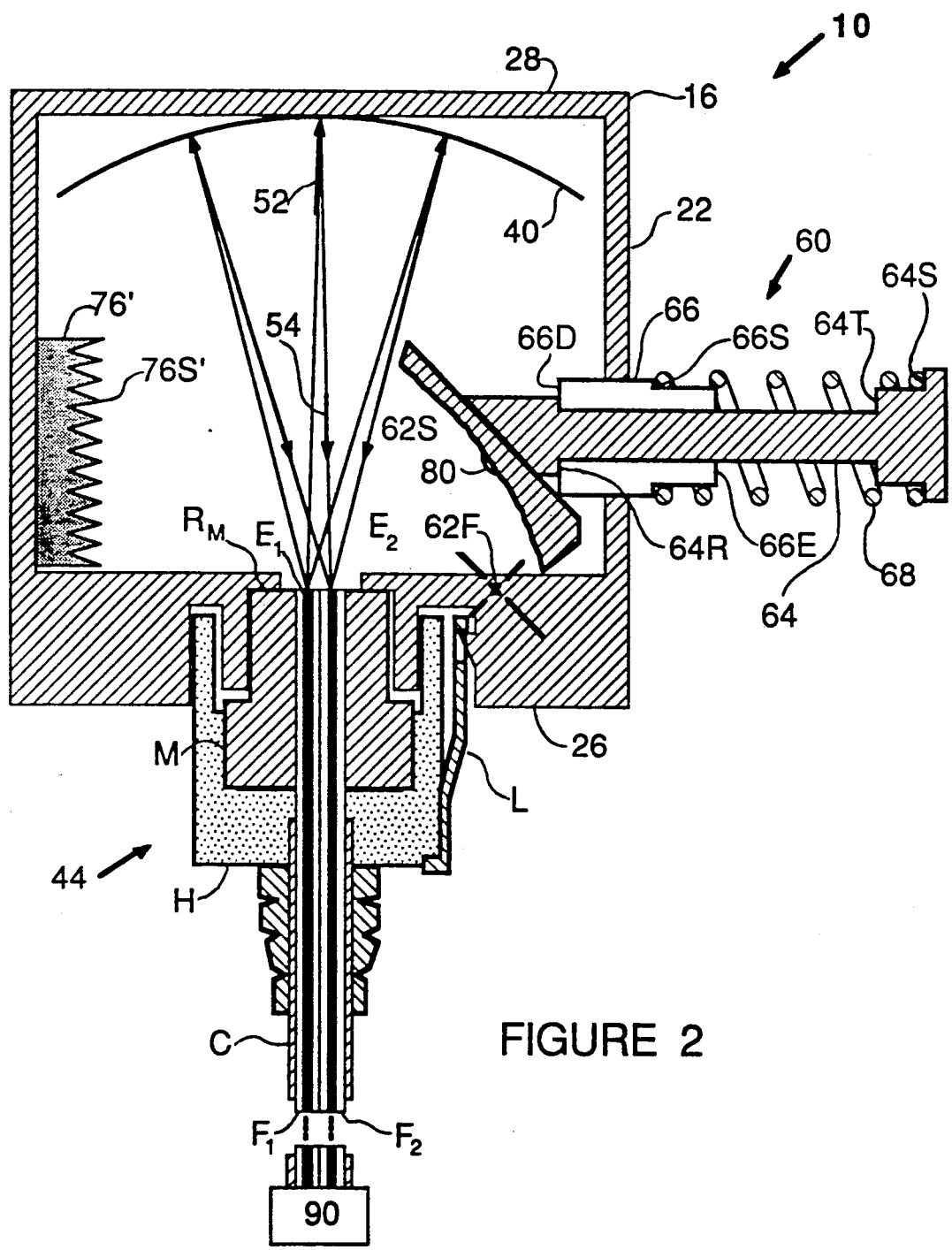
FIG. 2 is a side elevation view, in section, of the fiber optic switch of FIG. 1, taken along view lines 2—2 thereof showing the beam interrupter in its retracted position.
Figure 3:
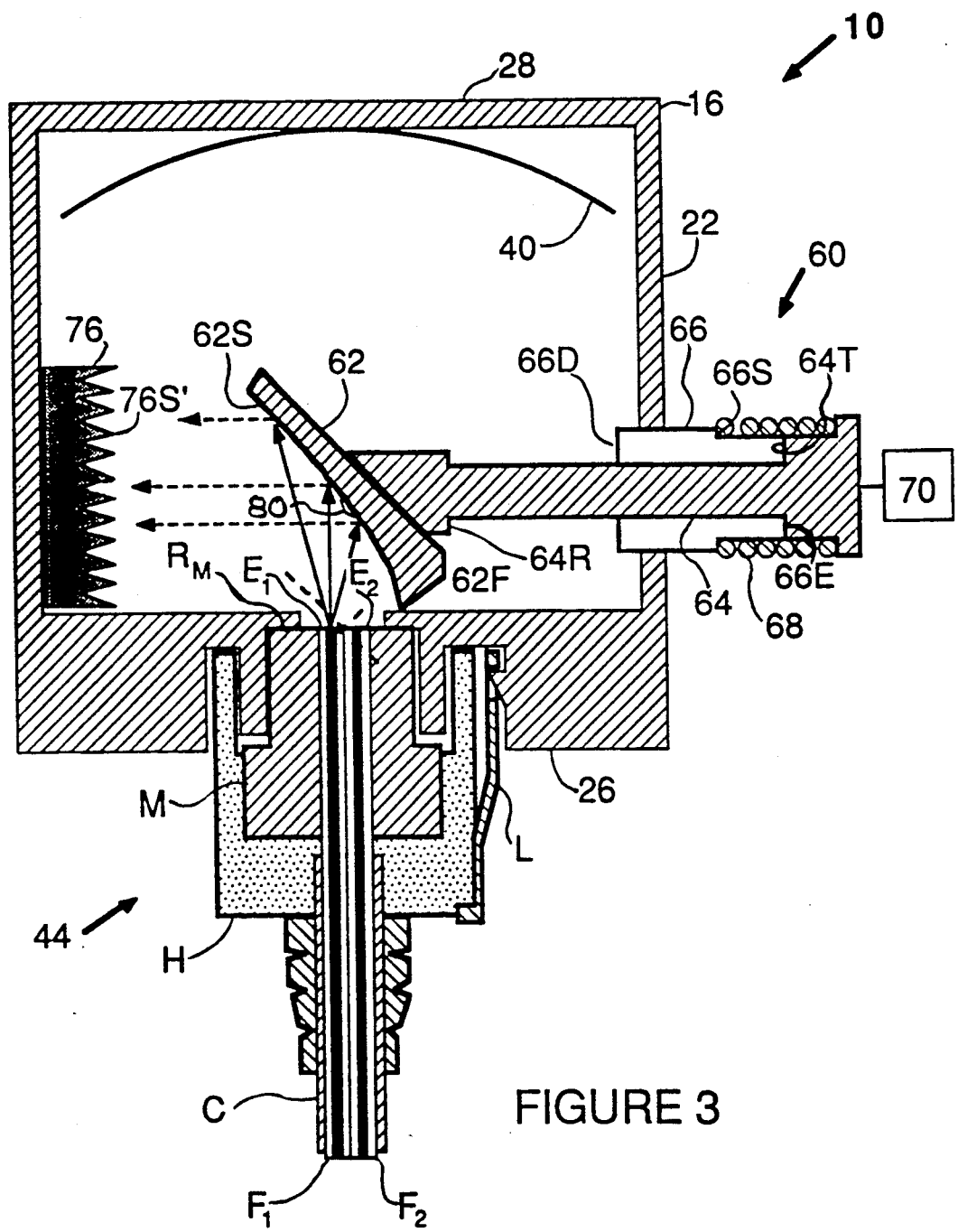
FIG. 3 is a side elevation view similar to FIG. 2 showing the fiber optic switch with the beam interrupter in its interdiction position.
Figure 4:
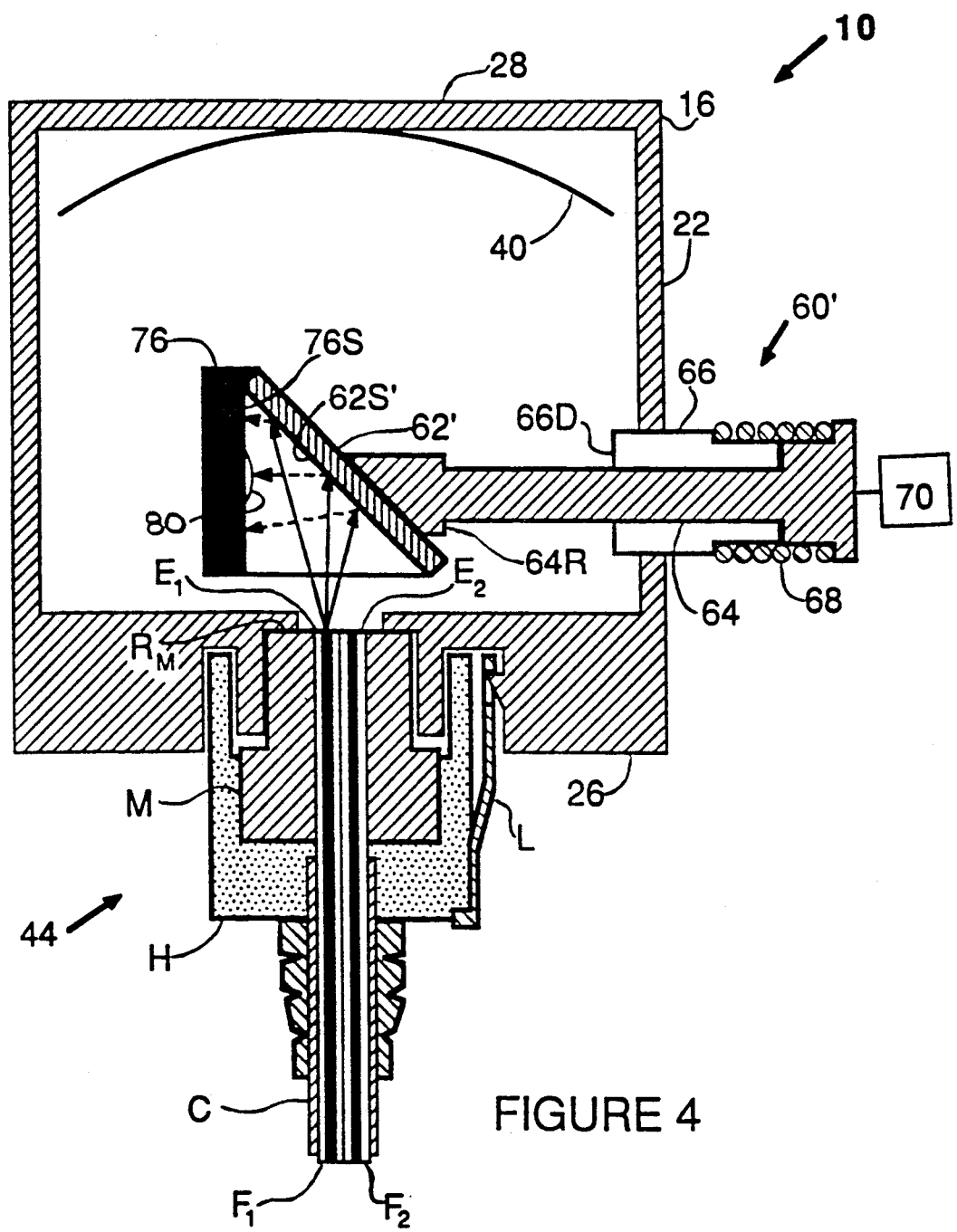
FIG. 4 is an alternate embodiment of the fiber optic switch in accordance with the present invention wherein the beam interrupter has a planar light absorbing member, the light absorber is mounted to the beam interrupter, the switch being illustrated with the beam interrupter in its interdiction position.
Figure 5:
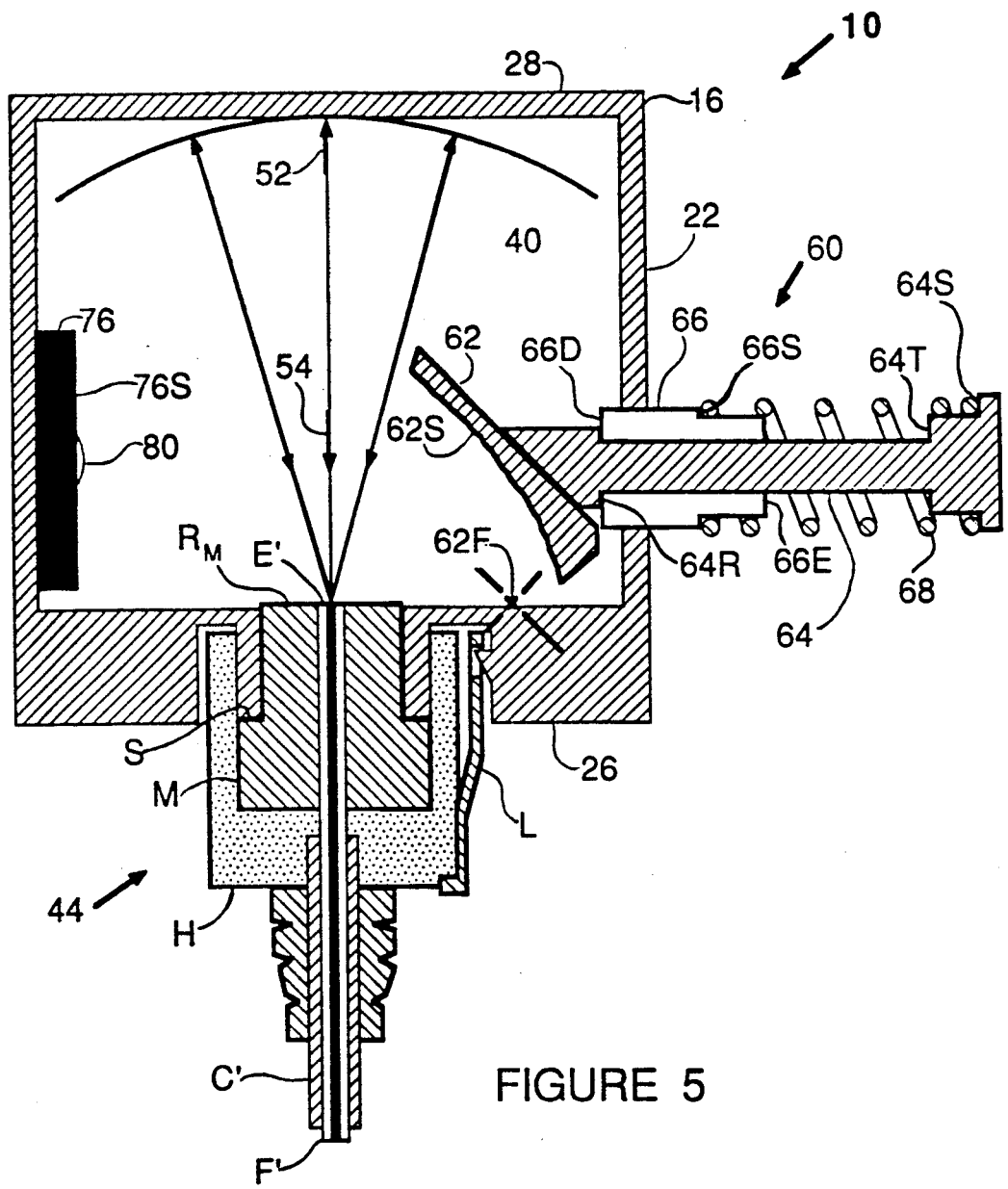
Figure 5:
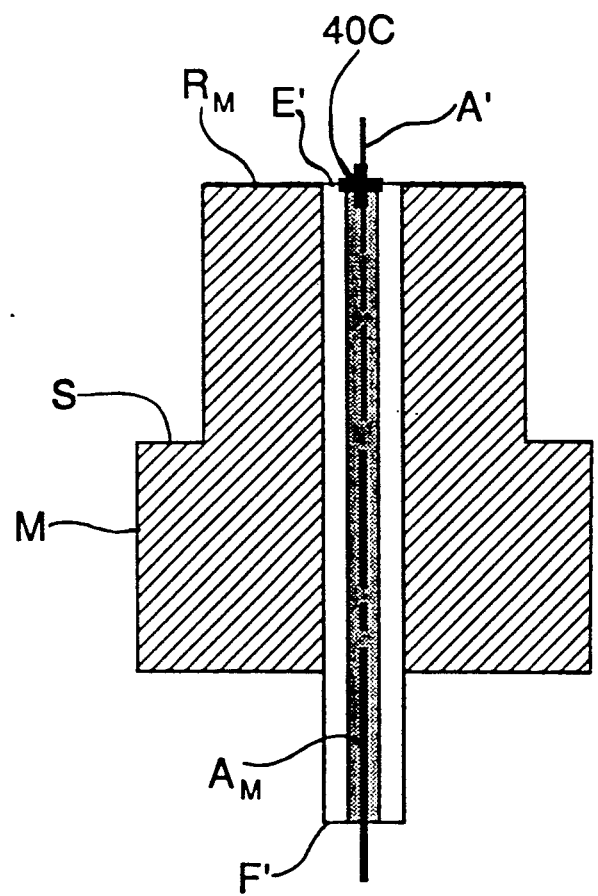
Figure 6:
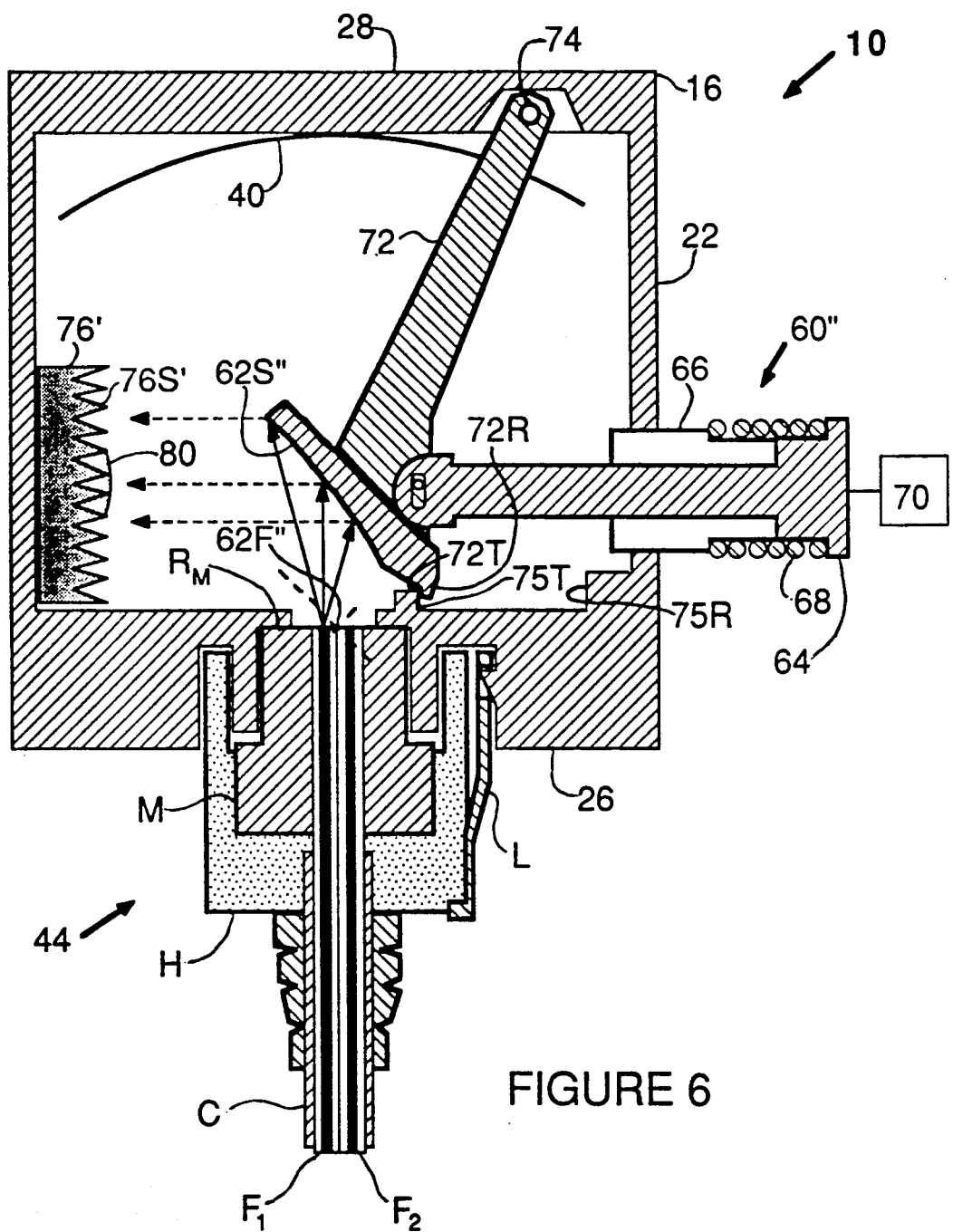
FIG. 6 is an alternate embodiment of the fiber optic switch in accordance with the present invention wherein the beam interrupter is rotatably actuable, the switch being illustrated with the beam interrupter in its interdiction position.

The switch 10 may accept a fiber optic cable having a first and at least a second optical fiber therein (FIGS. 1 through 4). In these Figures a single pair of optical fibers is illustrated, but it should be understood that a cable having more than two optical fibers may be used. Most typically, when more than two optical fibers are used in a cable they are disposed in pairs. The switch 10 may also accept a fiber optic cable having at least one bidirectional optical fiber therein (FIG. 5). FIGS. 4, 5 and 6 also illustrate alternate structural details whereby the fiber optic switch differs from that shown in FIGS. 1 to 3.

Figure 2A:
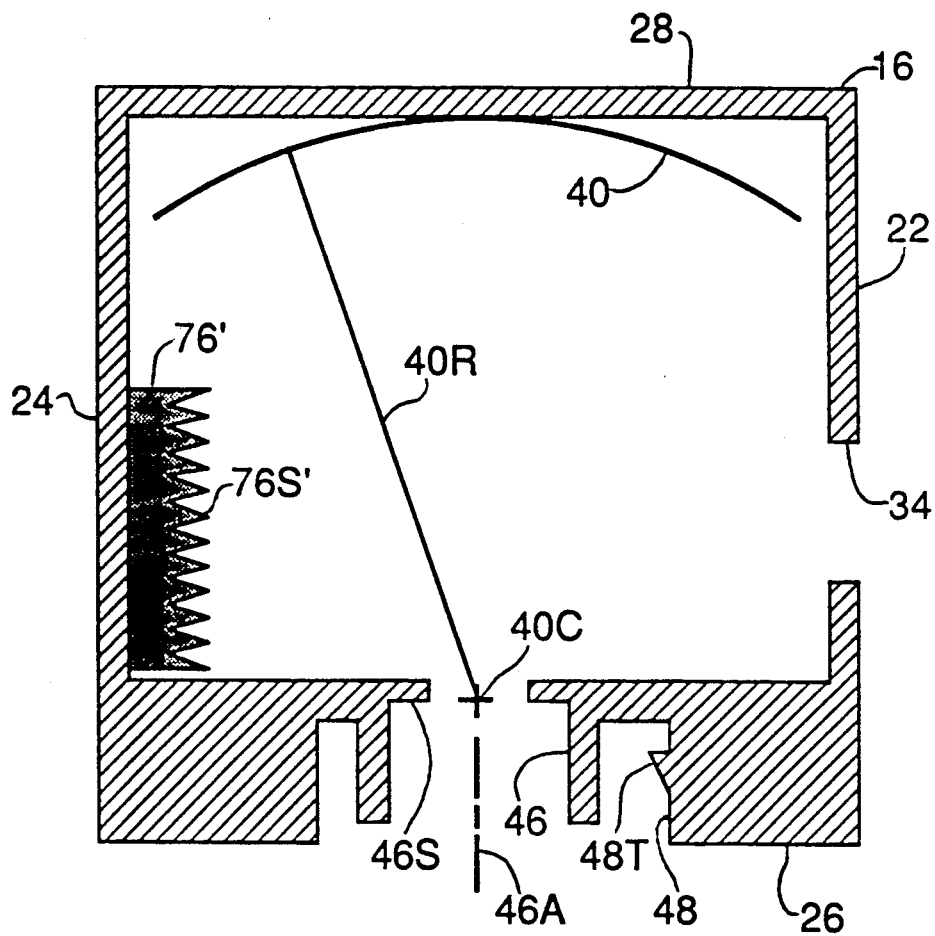

In the embodiment shown in FIGS. 1 through 3 the switch 10 is shown as having connected thereto a fiber optic cable C having a first optical fiber $F_1$ and at least a second optical fiber $F_2$. The switch 10 is operative to control the transmission of light from the first optical fiber $F_1$ to the second optical fiber $F_2$. Each fiber $F_1$ and $F_2$ has a respective end face $E_1$, $E_2$ thereon (FIGS. 2, 2C and 2D). A predetermined portion of each fiber $F_1$, $F_2$ has an axis $A_1$, $A_2$ therethrough adjacent to the respective end face $E_1$, $E_2$ (FIG. 2C). In the preferred implementation the fibers $F_1$, $F_2$, are mounted in a mounting ferrule M (FIGS. 2 and 2C). The ferrule M is preferably a generally hollow, right circular cylindrical member having a predetermined outer diameter D (FIG. 2D) and a rim $R_M$ (FIGS. 2, 2C and 2D) thereon. The ferrule M has an internal diameter "d" substantially equal to the sum of the diameters of the fibers $F_1$, $F_2$ received therein. The fibers $F_1$, $F_2$ are received in the ferrule M such that the axes $A_1$, $A_2$ of the fibers $F_1$, $F_2$ are parallel to each other and to the axis $A_M$ of the ferrule. Moreover the fibers $F_1$, $F_2$ are fixed, using an adhesive material such as epoxy, or otherwise secured, as by crimping, within the ferrule M such that the axes $A_1$, $A_2$ of the respective fibers $F_1$, $F_2$ are symmetrically disposed about the axis $A_M$ of the ferrule M. The end faces $E_1$, $E_2$ of the fibers $F_1$, $F_2$ are coplanar with the rim $R_M$ of the ferrule M (FIGS. 2, 2A and 2D). The ferrule M is itself received within a connector housing H having a latch L (FIGS. 2 and 2C). It should be understood that other suitable locking means, such that employed in commercially available type SMA or type ST fiber optic connectors may be used.

In the embodiment shown in FIG. 5 the switch 10 is shown as having connected thereto a cable C' having only a single bidirectional optical fiber F' therein. In this instance the axis A' of the fiber F' is coincident with the axis $A_M$ of the ferrule M. In this embodiment a positioning shoulder S is circumferentially disposed on the exterior of the ferrule M.

Referring to FIGS. 1 through 3, the switch 10 includes a housing 16 formed of a planar bottom 18, a planar top 20, both of which are joined by opposed parallel sidewalls 22, 24 and opposed parallel end walls 26, 28. The bottom, top, sidewalls and end walls cooperate to define an enclosed chamber 30. An access opening 34 extends through the sidewall 22 for a purpose to be made clearer herein. The housing 16 may be integrally formed or fabricated of conjoinable sections using any opaque material with a suitable coefficient of thermal expansion and sufficient structural integrity so that the switch may be used in industrial applications. Suitable materials which may be used to fabricate the housing 16 include, for example, die cast metal, a molded engineering resin or a carbon fiber or glass fiber filled engineering resin, or a carbon fiber or glass fiber filled engineering resin. Engineering resins such as nylon molding resin sold by E. I. du Pont de Nemours and Company under the trademark ZYTEL, glass-filled nylon resin sold by LNP Engineering Plastics of Malvern, Pennsylvania under the trademark VECTRA, or an engineering resin formed of acrylonitrile-butadiene-styrene (ABS), or polyether ether ketone (PEEK), may be used.

Disposed within the housing 16 is a curved concave reflector 40. Preferably, the curved concave reflector 40 is spherical in shape and has a center 40C, and a radius 40R. The spherical reflector 40 is fixedly located within the housing 16 adjacent to end wall 28 with the concavity thereof facing the first end wall 26. The center 40C of the curved concave reflector 40 lies within the chamber 30 of the housing 16 and defines a predetermined reference location therewithin. The reflector 40 may be made of precision formed (e.g., coined) metal or metal foil, or of molded plastic. The reflector may optionally be coated with a high reflectivity material, such as vacuum deposited aluminum. A transparent protective overcoat, such as silicon monoxide, may be applied to the reflective surface. The reflector 40 may be mounted within the housing 16 in any convenient manner or may be an integral part of the housing 16.

Means, generally indicated by reference character 44, for mounting at least a first optical fiber within the housing is disposed in the end wall 28. The mounting means 44 is arranged to position the end faces or end face of the respective plural optical fibers or single optical fiber carried within the cable with which the switch is used at a predetermined location within the housing 16. The center 40C of the curved concave reflector 40 typically defines the predetermined location within the housing 16 about which the fibers are symmetrically mounted (FIGS. 2, 2A and 2D) or at which the single fiber (FIG. 5) is mounted.

In the embodiment shown in FIGS. 1 through 3, in which the optical fibers $F_1$, $F_2$ are disposed within a mounting ferrule M as described above, the mounting means 44 takes the form of an appropriately positioned cylindrical bore 46 (FIG. 2A) extending partially through the end wall 26 to form a shoulder surface 46S. The diameter of the bore 46 is sized to closely match the predetermined outer diameter D of the ferrule M. The bore 46 extends through the wall 26 such that the axis 46A of the bore 46 extends through, and the plane of the shoulder 46S is coplanar with, the center 40C of the concave curved reflector 40. When the ferrule M extends through the bore 46 and the rim $R_M$ of the ferrule M abuts the shoulder surface 46S of the end wall 26 immediately adjacent the bore 46, the axis $A_M$ of the ferrule M coincides with the axis 46A of the bore 46 and the end faces $E_1$, $E_2$, of each fiber $F_1$, $F_2$ are coplanar with the center 40C.

With the ferrule M so positioned by the mounting means 44 each fiber $F_1$, $F_2$ is positioned within the chamber 30 such that the intersection of the axis $A_1$, $A_2$ of each end face $E_1$, $E_2$ of each fiber $F_1$, $F_2$ lies in close proximity to the center 40C of the spherical reflector 40 (FIG. 2D). Since the fibers $F_1$, $F_2$ are received within the ferrule M with their axes $A_1$, $A_2$ substantially parallel to the axis $A_M$ of the ferrule M, and since the axis $A_M$ of the ferrule M is coincident with the axis 46A of the bore 46, a portion of a beam of light emanating from the end face $E_1$ of the fiber $F_1$ propagates along an incidence path 52 toward the reflector 40. Light is reflected by the reflector 40 along a predetermined reflectance path 54. In the embodiment of FIGS. 1 to 3 the end face $E_2$ of the fiber $F_2$ lies in the reflectance path 54.

If desired, to achieve a more repeatable coupling loss between the fibers at the expense of slightly higher average coupling loss, the end faces $E_1$, $E_2$ may be axially displaced a small distance from being coplanar with center 40C. Displacement a distance of about up to about seven (7) percent of the radius of curvature 40R has been found to result in an acceptable coupling loss (6.2 decibels) for a typical fiber having a core diameter of two hundred (200) microns. This defocussing results in improved repeatibility of coupling loss from switch to switch.

In the embodiment shown in FIG. 5, a positioning shoulder S is circumferentially disposed on the exterior of the ferrule M. The ferrule M has an internal diameter substantially equal to the diameter of the fiber F' received therein. The fiber F' is received in the ferrule M such that the axis A' of the fiber F' is coaxial with axis $A_M$ of the ferrule. Moreover the fiber F' is fixed, or otherwise secured within the ferrule M, as described above, such that the end face E' of the fiber F' is coplanar with the rim $R_M$ of the ferrule M. The ferrule M is itself received within a connector housing H having a latch L thereon. The mounting means 44 takes the form of an appropriately positioned cylindrical bore 46 extending through the end wall 26. The diameter of the bore 46 is sized to closely match the predetermined outer diameter D of the ferrule M. The bore 46 extends through the wall 26 such that the axis 46A of the bore 46 extends through the center 40C of the concave curved reflector 40. When the ferrule M extends through the bore 46 and the shoulder S of the ferrule M abuts the outer surface 26S of the end wall 26 immediately adjacent the bore 46, the axis $A_M$ of the ferrule M coincides with the axis 46A of the bore 46 and the end face E' of the fiber F' is coplanar with the center 40C. Similar to the earlier discussion, commercially available type SMA or type ST fiber optic connectors may also be used.

In the embodiment of FIG. 5, since the axis A' of the bidirectional fiber F' lies along the axis $A_M$ of the ferrule M, and since the axis $A_M$ of the ferrule M is coincident with the axis 46A of the bore 46, the incidence path 52 and the reflectance path 54 are colinear, that is, each light ray in the incidence path 52 and in the reflectance path 54 lie on the same straight line, it also being understood, however, that each light ray in the reflectance path 54 is in opposite direction to the light rays of the incidence path 52. Similar to the situation shown in FIG. 2 the ferrule M is provided with a latch or other suitable locking means, such that employed in commercially available type SMA or type ST fiber optic connectors.

As should be appreciated from the foregoing that the particular form the mounting means 44 exhibits is dependent upon the form taken by the termination of the fiber optic cable C with which the switch 10 is being used. Thus, any convenient structural arrangement may be utilized to implement the mounting means 44 so long as the end face of the single optical fiber carried within the cable is located at the predetermined reference position defined by the center of the concave spherical reflector 40 (FIG. 5), or so long as the end faces of the optical fibers carried within the cable are located symmetrically about the predetermined reference position defined by the center of the concave spherical reflector 40 (FIGS. 1 to 4).

The switch 10 further comprises a light interrupter 60 switchable between a light transmissive state and a light interruptive state. In the preferred embodiment of the invention the light interrupter 60 comprises a light blocking member 62 having an opaque, substantially specularly reflective, partially light absorbing surface 62S thereon. That is, the light is not scattered when reflected from the surface 62S. The reflectivity of the surface 62S is preferably low (for example, less than ten percent reflective), but this property is less important than the specular reflectance property.

The light blocking member 62 is attached to a rod 64. The rod 64 extends through a collar 66 that is itself mounted in the first access opening 34 in the sidewall 22 of the housing 16. The collar 66 has interior and exterior end faces 66D, 66E, respectively. The rod 64 may have stops 64R, 64T thereon. The stops 64R, 64T may be integrally formed with the rod 64 or defined by suitable members affixed thereto.

The light interruptor 60 is displaceable in response to an actuating force (provided by an actuator as will be described) from a retracted position to an interdiction position. In the interdiction position the opaque surface 62S of the blocking member 62 is disposed in at least one of either the incidence path 52 or the reflectance path 54. When the light interrupter 60 occupies its light interdiction position the stop 64T abuts against the exterior end face 66E of the collar 66. Alternatively, when the light interrupter 60 occupies its retracted position the stop 64R abuts against the interior end face 66D of the collar 66. The disposition of the light interrupter 60 in the retracted position defines the light transmissive state of the light interrupter 60 while the disposition of the light interrupter 60 in the interdiction position defines the light interruptive state of the light interrupter 60.

A biasing element, such as a coil spring 68, is operatively associated with the light interrupter 60. For example, the spring 68 may be captured between the step 66S on the collar 66 and the step 64S on the rod 64. When so located the spring 68 serves to bias the light interrupter 60 toward the retracted position. Thus, a module 10 having the spring 68 positioned as shown in FIG. 2 would result in a "normally closed" switch, that is, one in which the beam interrupter would occupy a position corresponding to the light transmissive state. It should be understood that a suitable biasing element may alternatively be used to bias the light interrupter 60 toward the interdiction position. In such an alternate arrangement, for example, a spring (similar to the spring 68) would be positioned between the shoulder 64R on the rod 64 and the shoulder 66D on the collar 66. Such an arrangement would result in a "normally open" switch, that is, one in which the light interrupter would occupy a position corresponding to the light interruptive state.

As may best be seen in FIGS. 2 and 3, the surface 62S of light blocking member 62 may be shaped in the form of a segment of a concave paraboloid, or a piecewise linear approximation thereof, having a focus point 62F. It should be understood, of course, that the term "paraboloid" is not to be construed in a precise mathematical sense. The light blocking member 62 may be shaped in any suitable form such that light reflecting from the light blocking surface 62S is incident on and absorbed by the light absorbing member. Thus, the shape of the light blocking member may be such as to have light rays reflect therefrom in converging fashion, parallel fashion, or even in diverging fashion, so long as the light absorbing member is correspondingly configured.

Accordingly, as may be seen in FIG. 3, when light interrupter 60 is in its light interdicting position, focus point 62F is positioned at the center of curvature 40C of the spherical reflector 40. Alternatively, the surface 62S' of light blocking member 62' of the light interrupter 60' may take other forms, such as the planar embodiment illustrated in FIG. 4.

An actuator, generally indicated by reference character 70, is, in use, mounted to the exterior of the housing 16 of the switch module 10. The actuator 70 is operatively associated with the actuator rod 64 to cause the same to be displaced between its two positions. Although the precise form of the actuator 70 will vary in accordance with the environment with which the switch 10 is being used, in general it should be apparent that any suitable mechanism for applying the actuating force to the rod 64 lies within the contemplation of the present invention. For example, the actuator 70 may take the form of a mechanical linkage to a pushbutton as typically used in industrial control systems, or a linkage disposed within another housing having a rotating arm such as in a commercially available limit switch or a linkage coupled to a diapragm as in a commercially available pressure switch.

As may be seen in FIG. 6, in an alternate embodiment of light interrupter 60", the light blocking member 62" is attached to an arm 72. The arm 72 pivots about a pin 74 that is itself anchored to the housing 16. The rod 64 extends through a collar 66 that is itself mounted in the first access opening 34 in the sidewall 22 of the housing 16. The arm 72 has stops 72R, 72T which abut with corresponding surfaces 75R and 75T of the housing to define the respective retracted position and light interdicting positions of the light blocking surface 62S". A biasing element, such as a coil spring 68, serves to bias the light interrupter 60" toward the retracted position (i.e., a "normally closed" switch). Reversing the position of the coil spring would bias the light interrupter 60" toward the interdiction position (i.e., a "normally open" switch).

A light absorbing member generally indicated by reference character 76 is disposed in the housing 16 and suitably positioned therein with respect to the optically opaque surface 62S of the light blocking member 62. Residual light reflected from the optically opaque surface 62S is directed toward and absorbed by the light absorbing member 76. In one embodiment, shown in FIGS. 2 and 3, the light absorbing member is mounted to (or, if desired, integrally formed with) the interior surface of the sidewall 24 of the housing 16.

The light absorbing member 76 may take the form of a member having a grooved light absorbing surface 76S (FIGS. 2, 2A and 3). Alternatively, light absorbing surface 76S' may be planar (FIG. 5). To minimize the possibility of light reflection from the absorbing member back toward the opaque surface (and thus possibly to the fiber) the planar surface 76S' of the light absorbing member may be inclined at a predetermined angle with respect to the planar opaque surface 62S. In the event a grooved light absorbing surface 76S is used, the inclination of the walls of the grooves thereon define predetermined angles with respect to the planar opaque surface 62S.

It should also be understood, as illustrated in FIG. 4, that the light absorbing member may be mounted to (or formed structurally as part of) the light interrupter itself. The same considerations set forth above regarding the inclination of the surface of the absorbing member with respect to the opaque surface 62S will also apply.

The switch 10 in accordance with the present invention may further include a switch presence indicator, generally indicated by the reference character 80, for providing an indication that the light interrupter 60 occupies the interdiction position. The switch presence indicator 80 may be disposed on the surface 62S of the light blocking member 62, as shown in FIGS. 2 and 3, or may be mounted on the surface 76S or 76S', as the case may be, of the light absorbing member 76, as shown in FIG. 4. In the preferred case the switch presence indicator 80 comprises a dot 82 of a light scattering material, of a predetermined size and reflectance value. The reflectance and scattering factor of the material and size of the dot are selected to achieve in a typical case approximately ($-23$) decibel (one half of one percent) coupling between the fibers with the switch is in the "off" state.

Alternately, the switch presence indicator may comprise a predetermined portion of the surface 62S of the light blocking member 62 of the light interrupter 60. The predetermined portion of the surface 62S has a predetermined reflectance and a predetermined light scattering property associated therewith. For example, the surface 62S may be formed of #1502 Krylon flat white paint, manufactured by Borden, Inc. of Columbus, Ohio, which has been found to produce an approximate $-22$ decibel coupling between a pair of two hundred (200) micron diameter fibers with the switch in the "off" state.

When the switch presence indicator 80 is used in the multi-fiber embodiment of FIGS. 2 and 3, the indicator 80 serves to scatter a predetermined small amount of light emanating from the end face $E_1$ first fiber $F_1$ back toward the second fiber $F_2$. Alternatively, when the switch presence indicator 80 is used in the single fiber embodiment of FIG. 5 the indicator 80 serves to scatter a predetermined small amount of light emanating from the end face E' of the fiber F' back toward the fiber F'.

It should be noted that any of the alternate arrangements discussed herein may be used in any combination and still remain within the contemplation of the present invention.

Alternatively the light blocking member may take the form of a material whose optical properties are electrically alterable from a light transmissive state to a second state in which that the transmission of light through the material is interrupted in some manner. Accordingly, the use of an electrooptic material or a liquid crystal material for the light blocking member lies within the contemplation of the present invention.

In the FIGS. 2, 3 and 4, fibers $F_1$, $F_2$ are shown in side-by-side touching relationship, disposed about center 40C. The fibers $F_1$, $F_2$ may be separated, as long as they are symmetrically disposed about point 40C and the separation distance is much less than radius 40R. As the separation distance increases, the amount of light from the first fiber $F_1$ reflected by the spherical reflector 40 to the second fiber $F_2$ decreases. It should be noted that the angular orientation of the axes of the fibers about the center 40C is not critical, so long as the fibers remain symmetrically disposed about the center 40C.

In industrial applications the switch module 10 may be used in a fiber optic control system having an optical transceiver at the distal end of the cable C. The transceiver provides both a light source to the fiber(s) and a light detector. When both the source and detector are coupled to the appropriate electronic components, they may provide means for controlling electrical loads. The detector may be interfaced to an industrial programmable controller. When using the switch presence indicator the appropriate functional elements are provided to verify system integrity. The appropriate functional elements are indicated by reference character 90 (FIG. 2).

In view of the foregoing it may be readily appreciated by those skilled in the art that due to the geometrical relationship between the end(s) of the fiber(s) and the spherical reflector a switch in accordance with the present invention exhibits a high coupling efficiency (low light loss) when in the light transmissive or "on" state. The combination of the shape of the surface of the light interrupter and the light absorber insures a minimal amount of residual coupling when the switch is in the light interdiction or "off" state. The ratio of the high coupling efficiency in the "on" state to the minimal coupling when in the "off" state provides a switch exhibiting a wide dynamic range. The low coupling loss of the switch permits practical industrial applications, wherein fiber cables and connectors having various loss factors may be used. Use of the switch in accordance with this invention permits the use of fiber cables having lengths on the order of one to two (1-2) kilometers or more. The switch presence indicator provides an indication that the switch is present in the optical circuit when it is in the "off" state, thus rendering the switch in accordance with the present invention particularly suitable for industrial control applications.

Those skilled in the art, having the benefit of the teachings of the present invention, may impart numerous modifications thereto. It should be understood that such modifications are to be construed as lying within the scope of the present invention, as defined by the appended claims.

What is claimed is:

1. A switch for controlling the transmission of light from a first optical fiber to at least a second optical fiber, each optical fiber having an end face thereon, a predetermined portion of each optical fiber adjacent to the end face thereof having an axis therethrough, the switch comprising;

a housing;

a curved concave reflector fixedly mounted within the housing;

means for mounting a first optical fiber and a second optical fiber at predetermined locations within the housing such that at least a portion of a beam of light emanating from the end face of a first optical fiber mounted within the housing propagates along an incidence path toward the reflector from which the beam of light is reflected by the curved concave reflector along a predetermined reflectance path toward a second optical fiber mounted within the housing; and a light interrupter switchable between a light transmissive state and a light interruptive state, wherein the light interrupter has a surface formed of an optically opaque material, the light interrupter being displaceable from a retracted position to an interdiction position, in the interdiction position the surface of the light interrupter is disposed in at least one of either the incidence path or the reflectance path, the disposition of the light interrupter in the retracted position defining the light transmissive state of the light interrupter while the disposition of the light interrupter in the interdiction position defining the light interruptive state of the light interrupter;

the light interrupter being connectable to an actuator for displacing the same from one position to the other position, wherein the light interrupter has a surface thereon, the surface of the light interrupter defining at least a segment of a paraboloid, the paraboloid having a focus and an axis of symmetry, when the light interrupter is in the interdiction position and lies in the incidence path the surface of the light interrupter is positioned such that the focus of the paraboloid is at the center of the sphere and the axis of symmetry of the paraboloid defines a predetermined angle with the axis of a first optical fiber whereby light reflected from the surface is directed substantially orthogonal to the axis of a second optical fiber.

2. The switch of claim 1 wherein the mounting means mount each optical fiber such that the axis through the portion of one optical fiber is substantially parallel to the axis through the portion of the other optical fiber.

3. The switch of claim 1 further comprising a light absorbing member disposed in the housing and positioned with respect to the optically opaque surface of the light interrupter such that light reflected from the optically opaque surface is directed toward and absorbed by the light absorbing member.

4. The switch of claim 3 wherein the light absorbing member is mounted to the housing and wherein the light absorbing member defines a predetermined angle with respect to the axis of symmetry of the paraboloidal surface of the light interrupter.

5. The switch of claim 3 wherein the light absorbing member is defined by a portion of the housing and wherein the light absorbing member defines a predetermined angle with respect to the axis of symmetry of the paraboloidal surface of the light interrupter.

6. The switch of claim 3 wherein the light absorbing member is mounted to the light interrupter and wherein the light absorbing member defines a predetermined angle with respect to the axis of symmetry of the paraboloidal surface of the light interrupter.

7. The switch of claim 3 wherein the light absorbing member has a planar surface.

8. The switch of claim 3 wherein the light absorbing member has a grooved surface.

9. The switch of claim 3 further comprising a switch presence indicator for providing an indication that the light interrupter is disposed in the interdiction position.

10. The switch of claim 9 wherein the switch presence indicator comprises a predetermined portion of the surface of the light interrupter, the predetermined portion of the surface of the light interrupter having a predetermined reflectance and a predetermined light scattering property associated therewith, the predetermined portion of the surface of the light interrupter being operative to scatter a predetermined small amount of light emanating from the first optical fiber to the second optical fiber.

11. The switch of claim 9 wherein the switch presence indicator comprises a dot of light scattering material, the dot having a predetermined size and a predetermined reflectance, the dot of light scattering material being operative to scatter a predetermined small amount of light emanating from the first optical fiber to the second optical fiber.

12. The switch of claim 9 wherein the switch presence indicator is disposed on the surface of the light interrupter.

13. The switch of claim 9 wherein the switch presence indicator is disposed on the surface of the light absorbing member.

14. A switch for controlling the transmission of light from a first optical fiber to at least a second optical fiber, each optical fiber having an end face thereon, a predetermined portion of each optical fiber adjacent to the end face thereof having an axis therethrough, the switch comprising:

a housing;

a curved concave reflector fixedly mounted within the housing;

means for mounting a first optical fiber and a second optical fiber at predetermined locations within the housing such that at least a portion of a beam of light emanating from the end face of a first optical fiber mounted within the housing propagates along an incidence path toward the reflector from which the beam of light is reflected by the curved concave reflector along a predetermined reflectance path toward a second optical fiber mounted within the housing;

a light interrupter switchable between a light transmissive state and a light interruptive state, wherein the light interrupter has a surface formed of an optically opaque material, the light interrupter being displaceable from a retracted position to an interdiction position, in the interdiction position the surface of the light interrupter is disposed in at least one of either the incidence path or the reflectance path, the disposition of the light interrupter in the retracted position defining the light transmissive state of the light interrupter while the disposition of the light interrupter in the interdiction position defining the light interruptive state of the light interrupter;

the light interrupter being connectable to an actuator for displacing the same from one position to the other position, wherein the light interrupter has a surface thereon, the surface of the light interrupter is generally planar, when the light interrupter is in the interdiction position and lies in the incidence path the surface thereof defines a predetermined angle with the axis of a first optical fiber whereby light reflected from the surface is directed away from the end face of a second optical fiber; and a light absorbing member disposed in the housing and positioned with respect to the optically opaque surface such that light reflected from the optically opaque surface is directed toward and absorbed by the light absorbing member.

15. The switch of claim 14 wherein the light absorbing member is mounted to the housing and wherein the light absorbing member defines a predetermined angle with respect to the planar opaque surface.

16. The switch of claim 14 wherein the light absorbing member is defined by a portion of the housing and wherein the light absorbing member defines a predetermined angle with respect to the planar opaque surface of the light interrupter.

17. The switch of claim 14 wherein the light absorbing member is mounted to the light interrupter and wherein the light absorbing member defines a predetermined angle with respect to the planar opaque surface of the light interrupter.

18. The switch of claim 14 wherein the light absorbing member has a planar surface.

19. The switch of claim 14 wherein the light absorbing member has a grooved surface.

20. The switch of claim 14 further comprising a switch presence indicator for providing an indication that the light interrupter is disposed in the interdiction position.

21. The switch of claim 20 wherein the switch presence indicator comprises a dot of light scattering material, the dot having a predetermined size and a predetermined reflectance, the dot of light scattering material being operative to scatter a predetermined small amount of light emanating from a first optical fiber back toward a second optical fiber.

22. The switch of claim 20 wherein the switch presence indicator is disposed on the surface of the light interrupter 23. The switch of claim 20 wherein the switch presence indicator is disposed on the surface of the light absorbing member.

24. The switch of claim 20 further comprising a switch presence indicator for providing an indication that the light interrupter is disposed in the interdiction position.

25. The switch of claim 24 wherein the switch presence indicator comprises a dot of light scattering material, the dot having a predetermined size and a predetermined reflectance, the dot of light scattering material being operative to scatter a predetermined small amount of light emanating from a first optical fiber back toward a second optical fiber.

26. The switch of claim 24 wherein the switch presence indicator is disposed on the surface of the light interrupter.

27. A switch for controlling the transmission of light from a first optical fiber having an end face thereon, a predetermined portion of an optical fiber adjacent to the end face thereof having an axis therethrough, the switch comprising:

a housing;

a curved concave reflector fixedly mounted within the housing;

means for mounting at least an optical fiber at a predetermined location within the housing such that at least a portion of a beam of light emanating from the end face of an optical fiber mounted within the housing progates along an incidence path toward the reflector from which the beam of light is reflected by the curved concave reflector along a predetermined reflectance path: and a light interrupter, switchable between a light transmissive state and a light interruptive state, wherein the light interrupter has a surface formed of an optically opaque material, the light interrupter being displaceable from a retracted position to an interdiction position, in the interdiction position the surface of the light interrupter is disposed in at least one of either the incidence path or the reflectance path, the disposition of the light interrupter in the retracted position defining the light transmissive state of the light interrupter while the disposition of the light interrupter in the interdiction position defining the light interruptive state of the light interrupter, the light interrupter being connectable to an actuator for displacing the same from one position to the other position, wherein the light interrupter has a surface thereon, the surface of the light interrupter defining at least a segment of a paraboloid, the paraboloid having a focus and an axis of symmetry, when the light interrupter is in the interdiction position and lies in the incidence path the surface of the light interrupter is positioned such that the focus of the paraboloid is at the center of the sphere and the axis of symmetry of the paraboloid defines a predetermined angle with the axis of an optical fiber whereby light reflected from the surface is directed substantially orthogonal to the axis of an optical fiber.

28. The switch of claim 27 further comprising a light absorbing member disposed in the housing and positioned with respect to the optically opaque surface of the light interrupter such that light reflected from the optically opaque surface is directed toward and absorbed by the light absorbing member.

29. The switch of claim 28 wherein the light absorbing member is mounted to the housing and wherein the light absorbing member defines a predetermined angle with respect to the axis of symmetry of the paraboloidal surface of the light interrupter.

30. The switch of claim 28 wherein the light absorbing member is defined by a portion of the housing and wherein the light absorbing member defines a predetermined angle with respect to the axis of symmetry of the paraboloidal surface of the light interrupter.

31. The switch of claim 28 wherein the light absorbing member is mounted to the light interrupter and wherein the light absorbing member defines a predetermined angle with respect to the axis of symmetry of the paraboloidal surface of the light interrupter.

32. The switch of claim 28 wherein the light absorbing member has a planar surface.

33. The switch of claim 28 wherein the light absorbing member has a grooved surface.

34. The switch of claim 28 further comprising a switch presence indicator for providing an indication that the light interrupter is disposed in the interdiction position.

35. The switch of claim 34 wherein the switch presence indicator comprises a predetermined portion of the surface of the light interrupter, the predetermined portion of the surface of the light interrupter having a predetermined reflectance and a predetermined light scattering property associated therewith, the predetermined portion of the surface of the light interrupter being operative to scatter a predetermined small amount of light emanating from an optical fiber back toward itself.

36. The switch of claim 34 wherein the switch presence indicator comprises a dot of light scattering material, the dot of light scattering material being operative to scatter a predetermined small amount of light emanating from an optical fiber back toward itself.

37. The switch of claim 34 wherein the switch presence indicator is disposed on the surface of the light interrupter.

38. The switch of claim 34 wherein the switch presence indicator is disposed on the surface of the light absorbing member.

39. A switch for controlling the transmission of light from a first optical fiber having an end face thereon, a predetermined portion of an optical fiber adjacent to the end face thereof having an axis therethrough, the switch comprising:

a housing:

a curved concave reflector mounted within the housing:

means for mounting at least an optical fiber at a predetermined location within the housing such that at least a portion of a beam of light emanating from the end face of an optical fiber mounted within the housing propagates along an incidence path toward the reflector from which the beam of light is reflected by the curved concave reflector along a predetermined reflectance path:

a light interrupter switchable between a light transmissive state and a light interruptive state, wherein the light interrupter has a surface thereon, the surface of the light interrupter is generally planar, when the light interrupter is in the interdiction position and lies in the incidence path the surface thereof defines a predetermined angle with the axis of an optical fiber whereby light reflected from the surface is directed away from the end face thereof: and a light absorbing member disposed in the housing and positioned with respect to the optically opaque surface such that light reflected from the optically opaque surface is directed toward and absorbed by the light absorbing member 40. The switch of claim 39 wherein the light absorbing member is mounted to the housing and wherein the light absorbing member defines a predetermined angle with respect to the planar opaque surface.

41. The switch of claim 39 wherein the light absorbing member is defined by a portion of the housing and wherein the light absorbing member defines a predetermined angle with respect to the planar opaque surface.

42. The switch of claim 39 wherein the light absorbing member is mounted to the light interrupter and wherein the light absorbing member defines a predetermined angle with respect to the planar opaque surface of the light interrupter.

43. The switch of claim 39 wherein the light absorbing member has a grooved surface.

44. The switch of claim 39 wherein the light absorbing member has a grooved surface.

45. The switch of claim 39 further comprising a switch presence indicator for providing an indication that the light interrupter is disposed in the interdiction position.

46. The switch of claim 45 wherein the switch presence indicator comprises a dot of light scattering material, the dot having a predetermined size and a predetermined reflectance, the dot of light scattering material being operative to scatter a predetermined small amount of light emanating from an optical fiber back toward itself.

47. The switch of claim 45 wherein the switch presence indicator is disposed on the surface of the light interrupter.

48. The switch of claim 45 wherein the switch presence indicator is disposed on the surface of the light absorbing member.

49. The switch of claim 45 further comprising a switch presence indicator for providing an indication that the light interrupter is disposed in the interdiction position.

50. The switch of claim 49 wherein the switch presence indicator comprises a dot of light scattering material, the dot having a predetermined size and a predetermined reflectance, the dot of light scattering material being operative to scatter a predetermined small amount of light emanating from an optical fiber back toward itself.

51. The switch of claim 49 wherein the switch presence indicator is disposed on the surface of the light interrupter.

* * * * *